United States Patent
Nakaoka

(10) Patent No.: US 8,830,354 B2
(45) Date of Patent: Sep. 9, 2014

(54) IMAGE CAPTURING APPARATUS AND CONTROL METHOD THEREOF

(75) Inventor: Hiroshi Nakaoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/352,789

(22) Filed: Jan. 18, 2012

(65) Prior Publication Data
US 2012/0188408 A1    Jul. 26, 2012

(30) Foreign Application Priority Data
Jan. 25, 2011   (JP) ................................. 2011-013370

(51) Int. Cl.
| H04N 5/76 | (2006.01) |
| G02B 7/34 | (2006.01) |
| G02B 7/28 | (2006.01) |
| H04N 5/232 | (2006.01) |
| G03B 13/36 | (2006.01) |

(52) U.S. Cl.
CPC .. *G02B 7/28* (2013.01); *G02B 7/34* (2013.01); *H04N 5/232* (2013.01); *G03B 13/36* (2013.01)
USPC .................................................. 348/231.99

(58) Field of Classification Search
CPC .......................... H04N 5/23212; H04N 5/3696
USPC .................................................... 348/231.99
See application file for complete search history.

(56) References Cited

U.S. PATENT DOCUMENTS

| 6,819,360 B1* | 11/2004 | Ide et al. ........................ 348/340 |
| 6,933,978 B1* | 8/2005 | Suda .............................. 348/345 |
| 7,812,299 B2* | 10/2010 | Kusaka ...................... 250/208.1 |
| 8,269,861 B2* | 9/2012 | Aragaki ........................ 348/241 |
| 2011/0199506 A1* | 8/2011 | Takamiya ................... 348/222.1 |
| 2013/0050550 A1* | 2/2013 | Shintani et al. ............... 348/294 |

FOREIGN PATENT DOCUMENTS

JP     2007-325139     12/2007

* cited by examiner

*Primary Examiner* — James Hannett
(74) *Attorney, Agent, or Firm* — Cowan, Liebowitz & Latman, P.C.

(57) ABSTRACT

An image capturing apparatus comprises: an image sensor including multiple pixels, each having pupil-divided multiple photoelectric converters, a storage unit that stores the respective pupil-divided image signals, and a control unit, and an operation of adding the image signals on a pixel-by-pixel basis and outputting the resulting signal; a determination unit configured to determine a focus control area, using an image expressed by the image signal output from the image sensor; and a focus control unit configured to carry out focus control according to the phase difference detection method based on the pupil-divided image signals output from the pixels within the focus control area, wherein the control unit switches between an operation of individually outputting the pupil-divided image signals within the focus control area, and an operation of adding and outputting the pupil-divided image signals output from pixels outside of the focus control area on a pixel-by-pixel basis.

16 Claims, 15 Drawing Sheets

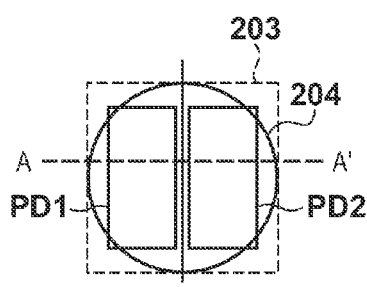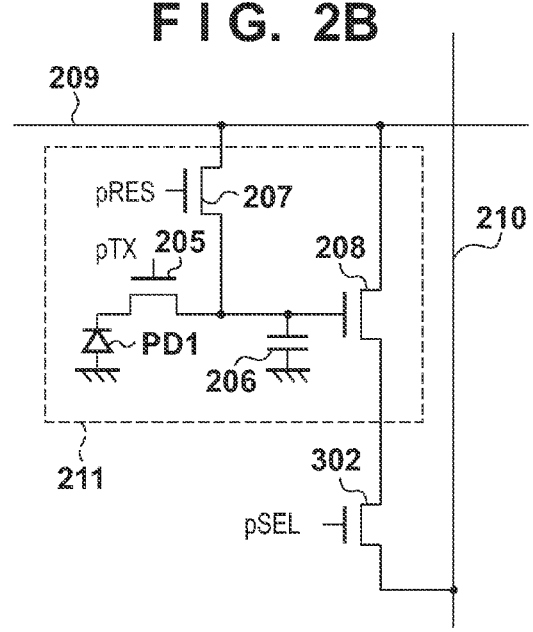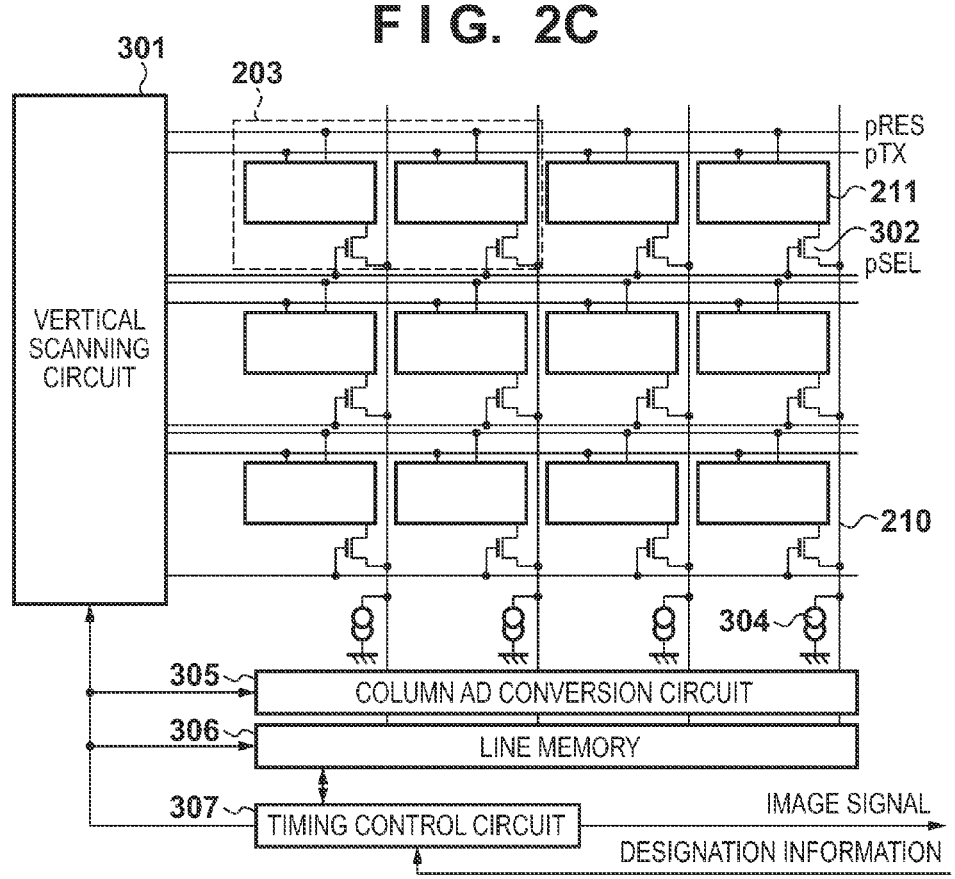

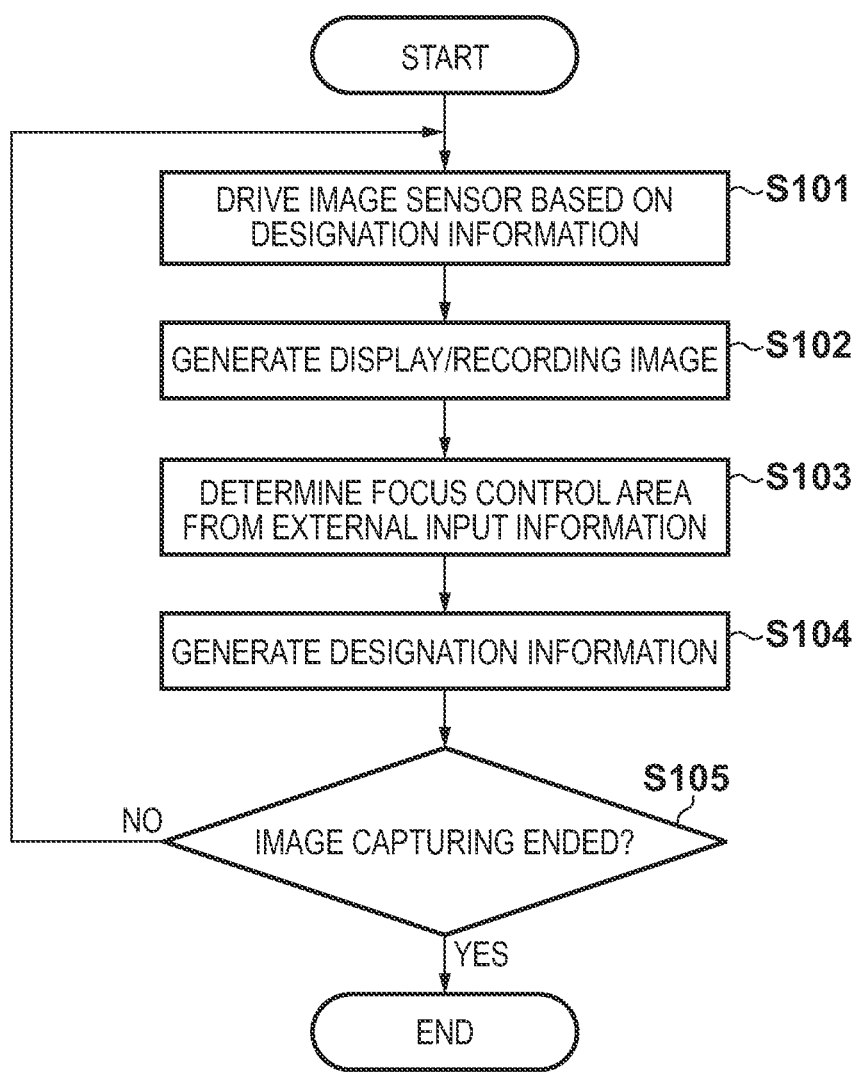

IMAGE CAPTURING APPARATUS AND CONTROL METHOD THEREOF

BACKGROUND OF THE INVENTION

1. Field of the Invention

The present invention relates to image capturing apparatuses and control methods thereof, and particularly relates to image capturing apparatuses capable of reading out a pair of signals based on light beams from pixels that have passed through different pupil areas of an optical system, and to control methods thereof.

2. Description of the Related Art

Techniques for implementing both a focus detection function and image signal acquisition using a single image sensor have been known for some time, and a technique in which information acquisition pixels for focus detection can also be used as image acquisition pixels for acquiring an image signal has been proposed as an example of such (for example, see Japanese Patent Laid-Open No. 2007-325139). According to this technique, the information acquisition pixels are divided into four regions in the horizontal and vertical directions, and when an image is to be acquired, an image signal is obtained by adding together signals from the four regions obtained through this division. Meanwhile, when controlling the focus, the signals of two of the four regions obtained through the division in either the horizontal or vertical direction are added together; pupil division is carried out in the pixels as a result, and the signals are used as focus control signals according to a phase difference detection method.

However, with an increase in the number of pixels in image sensors, it is necessary to read out a great number of pixel signals within a predetermined amount of time; on the other hand, systems are experiencing increasing burdens due to increases in the output rates of image sensors, increases in the number of output channels, and so on. For example, there is a problem in that the complexity of signal delay amount adjustment between channels increases due to an increase in the number of output channels or an increase in the signal output rate. Because such a configuration increases the number of signal readouts, the system will experience an increased burden particularly in the case of an image sensor in which single pixels are configured of multiple photoelectric converters and a pupil division readout function is provided.

SUMMARY OF THE INVENTION

The present invention has been made in consideration of the above situation, and shortens the readout time of an image signal from an image sensor while making it possible to set a focus control area in a desired region within the image sensor.

According to the present invention, provided is an image capturing apparatus comprising: an image sensor including multiple pixels, each pixel having multiple photoelectric converters that receive light beams that have passed through different areas of an exit pupil of an optical system and that output pupil-divided image signals, a storage unit that stores the respective pupil-divided image signals output from the respective photoelectric converters, and a control unit that switches between an operation of outputting the individual pupil-divided image signals stored in the storage unit, and an operation of adding the image signals on a pixel-by-pixel basis and outputting the resulting signal; a determination unit configured to determine a focus control area that is an area of the image sensor where is to be focused, using an image expressed by the image signal output from the image sensor; and a focus control unit configured to carry out focus control according to the phase difference detection method based on the pupil-divided image signals output from the pixels within the focus control area, wherein the control unit switches between an operation that the pupil-divided image signals output from pixels within the focus control area are output individually, and an operation that the pupil-divided image signals output from pixels outside of the focus control area are added on a pixel-by-pixel basis and output.

According to the present invention, provided is a control method for an image capturing apparatus, the apparatus including an image sensor having multiple pixels, each pixel having multiple photoelectric converters that receive light beams that have passed through different areas of an exit pupil of an optical system and that output pupil-divided image signals, a storage unit that stores the respective pupil-divided image signals output from the respective photoelectric converters, and a control unit that switches between an operation of outputting the individual pupil-divided image signals stored in the storage unit, and an operation of adding the image signals on a pixel-by-pixel basis and outputting the resulting signal, and the method comprising: determining a focus control area that is an area of the image sensor where is to be focused, using an image expressed by the image signal output from the image sensor; switching between an operation that the pupil-divided image signals output from pixels within the focus control area are output individually, and an operation that the pupil-divided image signals output from pixels outside of the focus control area are added on a pixel-by-pixel basis and output; and carrying out focus control according to the phase difference detection method based on the pupil-divided image signals output from the pixels within the focus control area.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A through 2C are diagrams illustrating a detailed configuration of an image sensor according to the first embodiment;

FIG. 4 is a flowchart illustrating a flow for determining a focus control area and generating designation information according to the first embodiment;

DESCRIPTION OF THE EMBODIMENTS

Exemplary embodiments of the present invention will be described in detail in accordance with the accompanying drawings.

First Embodiment

Figure 1:
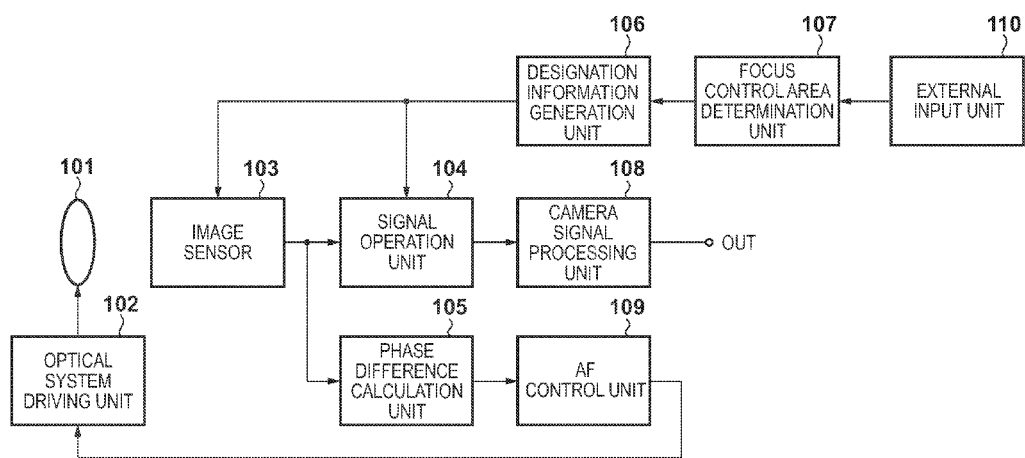
FIG. 1 is a block diagram illustrating a brief configuration of an image capturing apparatus according to a first embodiment of the present invention.

FIG. 1 is a block diagram illustrating a brief configuration of an image capturing apparatus according to a first embodiment of the present invention. In FIG. 1, an optical system 101 includes a focus lens and furthermore includes a zoom lens, an aperture, and so on, and an optical system driving unit 102 controls the optical system 101, using control signals, in accordance with optical system driving information output from an AF control unit 109, which will be mentioned later.

An image sensor 103 converts a subject image into an electrical signal through photoelectric conversion and outputs the resulting signal as an image signal, and the image signal is read out in accordance with designation information output from a designation information generation unit 106, which will be described later. In the present first embodiment, as will be described later, each pixel includes multiple photoelectric converters, each of which receives light beams that have passed through different regions of an exit pupil of the optical system 101 and outputs pupil-divided image signals. Note that the configuration of the image sensor 103 will be described in detail later with reference to FIGS. 2A and 2B. A signal operation unit 104 carries out computational processes on the image signals output from the image sensor 103, and as will be described later, carries out computations on the image signals in accordance with the designation information output from the designation information generation unit 106, outputting the resulting signals as image signals for displaying and recording. A camera signal processing unit 108 carries out image processing such as color conversion, white balance correction, gamma correction, and so on, as well as resolution conversion processes, image compression processes, and the like on the image signals obtained from the signal operation unit 104; the camera signal processing unit 108 then outputs the processed image signals to a recording device, a display device, or the like (not shown).

An external input unit 110 receives instructions from a user, and a focus control area determination unit 107 determines a focus control area, which is a target area for focus control, in accordance with external input information sent from the external input unit 110. The focus control area determination unit 107 passes information of the determined focus control area (focus control area information) to the designation information generation unit 106. The designation information generation unit 106 generates, based on the focus control area information, the designation information indicating the inside of the focus control area or the outside of the focus control area, and sends the designation information to the image sensor 103 and the signal operation unit 104.

A phase difference calculation unit 105 calculates, from the pupil-divided image signals output from the image sensor 103, a phase difference evaluation value for carrying out focus control using the phase difference detection method. An AF control unit 109 calculates, based on the phase difference evaluation value calculated by the phase difference calculation unit 105, the optical system driving information for controlling the focus lens position of the optical system 101. In other words, focus control according to a known phase difference detection method is carried out by the phase difference calculation unit 105 and the AF control unit 109.

Next, the configuration of the image sensor 103 according to the first embodiment will be described with reference to FIGS. 2A through 2C. The image sensor 103 according to the present first embodiment is, for example, a CMOS image sensor that adopts an XY addressing scanning method.

FIG. 2A is a top view schematically illustrating a single pixel 203, which includes multiple photoelectric converters, such as photodiodes, that convert incident light into an electrical charge. FIG. 2A illustrates an example that includes two photoelectric converters PD1 and PD2, and the structure is provided with a single microlens 204 that is shared by the photoelectric converters PD1 and PD2. The photoelectric converters PD1 and PD2 are also present, with the same positional relationship as illustrated here, in the other pixels of the image sensor 103. By employing such a configuration, the photoelectric converters PD1 and PD2 receive light beams that have passed through different regions of the exit pupil of the optical system 101.

FIGS. 2B and 2C are circuit diagrams for the image sensor 103; FIG. 2B is a circuit diagram illustrating the circuitry 211 of one of the photoelectric converters of which the pixel 203 is configured (this circuitry will be called a "half pixel unit" hereinafter), whereas FIG. 2C illustrates the overall configuration that includes the pixel 203. Although the example shown in FIG. 2B illustrates the half pixel unit 211 that includes the photoelectric converter PD1, it should be noted that a half pixel unit that includes the photoelectric converter PD2 has the same configuration. In addition, although FIG. 2C illustrates three rows by two columns' worth of pixels 203 (in other words, three rows by four columns' worth of half pixel units 211) in order to facilitate the descriptions, in reality, there are normally several hundreds of thousands to several tens of millions of pixels 203 disposed two-dimensionally at a predetermined aspect ratio. Furthermore, each pixel 203 may be covered by a color filter having either an R, G, or B, and, for example, the R, G, and B color filters may be arranged as a Bayer array.

In FIG. 2B, a floating diffusion unit (FD) 206 serves as an accumulation region in which the electrical charge generated by the photoelectric converter PD1 is temporarily accumulated. Reference numeral 205 denotes a transfer switch that transfers the electrical charge generated by the photoelectric converter PD1 to the FD 206 according to a transfer pulse pTX; 207, a reset switch that removes the electrical charge accumulated in the FD 206 according to a reset pulse pRES; 208, an MOS amplifier that functions as a source follower amplifier; and 302, a selection switch for selecting a column. The gates of the transfer switch 205, the reset switch 207, and the selection switch 302 are connected to respective signal lines to which the pTX, pRES, and pSEL are supplied in row units, as illustrated in FIG. 2C; selection scanning is carried out by a vertical scanning circuit 301. Meanwhile, the drains of the reset switch 207 and the MOS amplifier 208 are connected to a power source line 209.

Meanwhile, in FIG. 2C, a constant current source 304 serves as a load for the MOS amplifier 208, and the half pixel unit 211 and the constant current source 304 are connected, in column units, to a column AD conversion circuit 305 via a signal output line 210. A floating diffusion amplifier is configured by the FD 206, the MOS amplifier 208, and the constant current source 304. A signal charge of the pixel selected by the selection switch 302 is converted into a voltage, and the resulting voltage is output to the column AD conversion circuit 305 through the signal output line 210.

The column AD conversion circuit 305 is a circuit that converts the voltage signal output from the half pixel unit 211 into a digital code. The circuit 305 generally has a configuration in which the voltage signal and a ramp waveform are compared using a comparator, and the counter value that occurs when the voltage signal and the ramp waveform match due to the counter being incremented when the ramp waveform output begins is converted into the digital code. A line memory 306 stores, as a digital signal, the output of the half pixel unit 211 that has been converted into digital code by the column AD conversion circuit 305. A timing control circuit 307 outputs the digital signal stored in the line memory 306 as an image signal based on the designation information sent from the designation information generation unit 106. The timing control circuit 307 has a configuration in which the digital signals from the photoelectric converters PD1 and PD2 in each pixel 203 can be read out from the line memory 306 simultaneously and added together through signal processing and output, or the digital signals from the photoelectric converters PD1 and PD2 can be output individually.

Next, a method for determining a focus control area and the procedure for generating the designation information thereof according to the present first embodiment will be described.

Figure 3A:
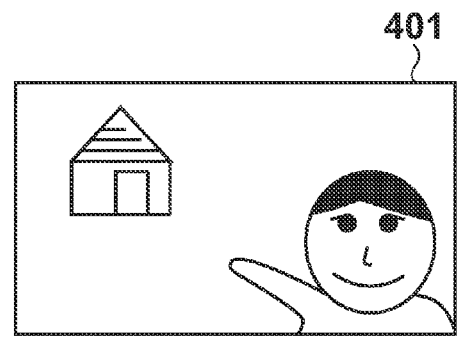
FIGS. 3A through 3C are diagrams illustrating a method for designating a focus control area according to the first embodiment.
Figure 3B:
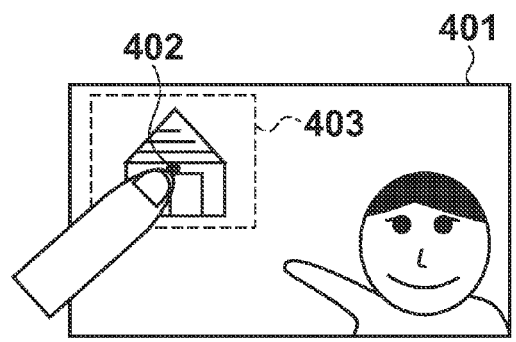
Figure 3C:
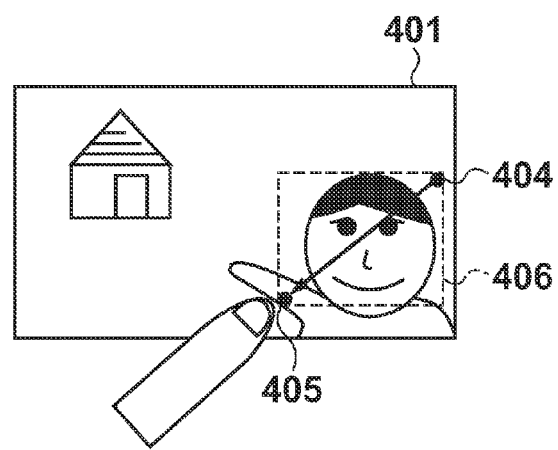

FIGS. 3A through 3C are diagrams illustrating a method for designating a focus control area according to the first embodiment. Note that the "focus control area" refers to an area of the image that is to be focused on. In FIG. 3A, reference numeral 401 denotes a display/recording image captured by the image sensor 103 and output via the camera signal processing unit 108. The user designates a subject 402 that he/she wishes to focus on, as shown in FIG. 3B, using an input device that also functions as a display device, such as a touch panel or the like, serving as the external input unit 110. The external input unit 110 sends obtained external input information to the focus control area determination unit 107, and the focus control area determination unit 107 determines a focus control area 403, having a predetermined size, so that the central area thereof overlaps with the subject 402 designated by the user. The focus control area information of the determined focus control area 403 is then sent to the designation information generation unit 106.

Alternatively, the user may designate an area 406 that is to be focused on as a start point 404 and an end point 405 using an input device that also functions as a display device, such as a touch panel or the like, serving as the external input unit 110. In this case, the external input unit 110 sends position information of the obtained start point 404 and the end point 405 to the focus control area determination unit 107, and the focus control area determination unit 107 determines the rectangular area that takes the start point 404 and the end point 405 as opposing corners as the focus control area 406. The focus control area information of the focus control area 406 is then sent to the designation information generation unit 106.

Note that the present invention is not limited to the aforementioned method for designating the focus control area, and any method may be used as long as the user can designate the focus control area, such as displaying frames or the like indicating multiple predetermined focus control areas and allowing the user to select one of those frames.

Next, a flow for determining the focus control area and generating the designation information will be described with reference to the flowchart in FIG. 4.

First, in step S101, an image signal is read out from the image sensor 103 in accordance with the designation information output from the designation information generation unit 106. In accordance with the designation information, the image sensor 103 changes the method for reading out the digital signals from the two photoelectric converters PD1 and PD2, which configure each pixel, that are stored in the line memory 306 as described earlier. With pixels that are within the focus control area, it is necessary to read out the respective digital signals from the photoelectric converters PD1 and PD2 in order to carry out a focus control process according to the phase difference detection method; therefore, the timing control circuit 307 outputs the digital signals from the line memory 306 individually in accordance with the designation information. As opposed to this, with pixels that are outside of the focus control area, it is only necessary to obtain a signal for each pixel, and thus it is not necessary to individually read out the digital signals from the photoelectric converters PD1 and PD2. Accordingly, in accordance with the designation information, the timing control circuit 307 reads out the digital signals of the photoelectric converters PD1 and PD2 from the line memory 306 simultaneously, carries out an adding process, and outputs the result. In this manner, the designation information output to the timing control circuit 307 can be expressed as a binary value indicating whether or not to add for each pixel. For this reason, it is also possible to generate a 1-bit digital code for each pixel and multiplex multiple codes so as to send the codes collectively to the image sensor 103.

Next, in step S102, the display/recording image is generated by the signal operation unit 104 from the image signal read out from the image sensor 103 in accordance with the designation information in step S101. The "display/recording image" refers to an image signal configured of a predetermined number of pixels, and the signal operation unit 104 carries out a process for setting an image signal having a given number of data output from the image sensor 103 to the number of pixels in the display/recording image in accordance with the designation information.

Figure 5:
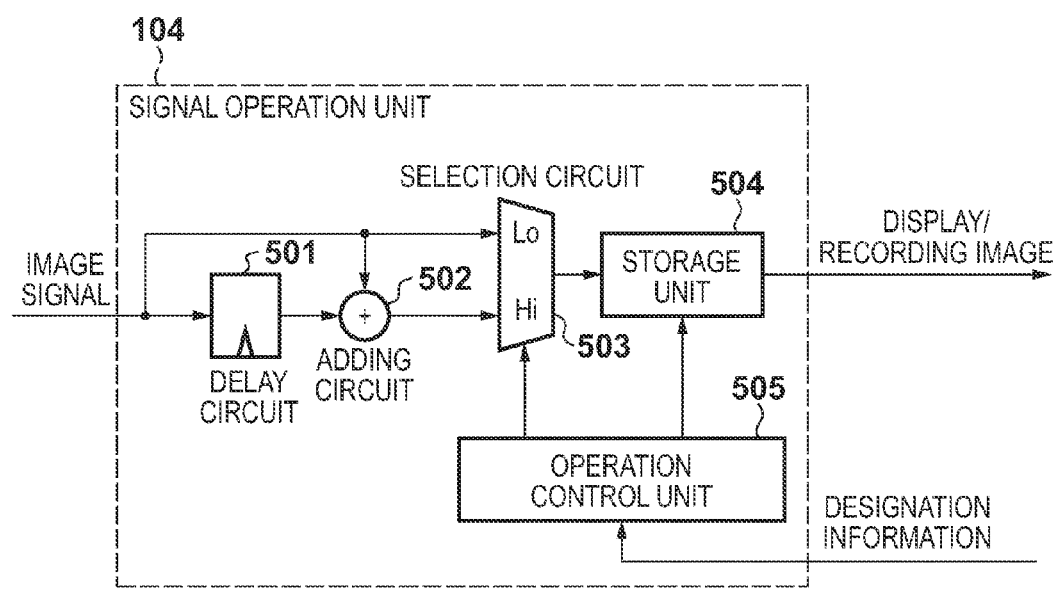
FIG. 5 is a block diagram illustrating a configuration of a signal operation unit according to the first embodiment.

Here, the process for setting the image signal read out from the image sensor 103 to the number of pixels in the display/recording image, as carried out by the signal operation unit 104, will be described. FIG. 5 is a block diagram illustrating the internal configuration of the signal operation unit 104. In FIG. 5, reference numeral 501 denotes a delay circuit; and 502, an adding circuit. Under the control of an operation control unit 505, a selection circuit 503 selects the input image signal or the output of the adding circuit 502 in accordance with the designation information generated by the designation information generation unit 106. A storage unit 504 stores the signal selected by the selection circuit 503. The operation control unit 505 also outputs a control signal based on the designation information to the storage unit 504.

Figure 6:
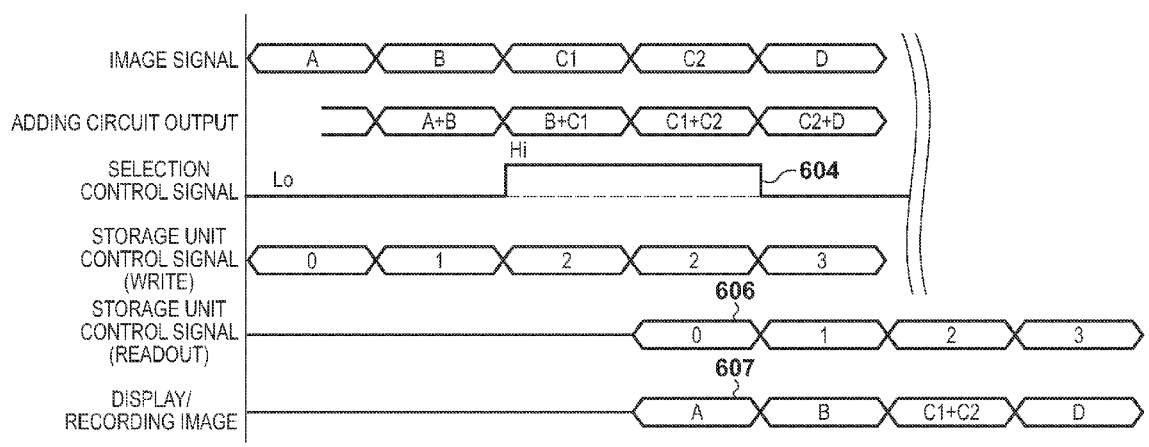
FIG. 6 is a timing chart illustrating processing performed by the signal operation unit according to the first embodiment.

FIG. 6 is a timing chart illustrating the signal processing performed by the signal operation unit 104. Note that for the sake of simplicity, here, the focus control area will be described as corresponding to a single pixel. As shown in FIG. 6, the image signals output from the image sensor 103 are output in time series order. Here, it is assumed that the image signals are output in the order A, B, C1, C2, and D. Of these, A, B, and D indicate digital signals that have been added on a pixel-by-pixel basis by the timing control circuit 307 of the image sensor 103, whereas C1 and C2 indicate digital signals obtained by outputting the digital signals of the photoelectric converters PD1 and PD2 individually without adding. In addition, signals that have been added to the signals one pixel previous, delayed by the delay circuit 501 by a single datum's worth, are sequentially output from the adding circuit 502.

A selection control signal is a signal generated by the operation control unit 505 in accordance with the designation information. The designation information that is also sent to the image sensor 103 is information expressing whether or not to add the signals of the two photoelectric converters PD1 and PD2 in the pixel 203 together using the timing control circuit 307. Therefore, the signal operation unit 104 can determine, based on the designation information, whether or not the image signal input into the signal operation unit 104 is a signal that has been added by the timing control circuit 307. The designation information may be any information expressing whether or not to add for a single pixel, and may be configured as 1-bit digital code. The designation information configured in this manner realizes the control of the selection circuit 503 by converting the signals indicated as Hi and Low in FIG. 6 so that the selection circuit 503 can be controlled by the operation control unit 505. Here, the selection circuit 503 selects the image signal input from the image sensor 103 when Low, and selects the output of the adding circuit 502 when Hi.

A storage unit control signal (write) expresses, in a simplified manner, an address in the storage unit 504 when writing the output of the selection circuit 503 to the storage unit 504, and, like the selection control signal, is generated by the operation control unit 505 based on the designation information output from the designation information generation unit 106. With such a configuration, when the selection control signal is Low, the image signal A is stored in an address 0 of the storage unit 504, the image signal B is stored in an address 1 of the storage unit 504, and so on. Meanwhile, with respect to the image signals C1 and C2 output from the two photoelectric converters PD1 and PD2 in the pixel 203, when the selection control signal is Hi, first, the signal B+C1, which is the output of the adding circuit 502, is stored in an address 2. Then, at the next timing, the signal C1+C2, obtained by adding the image signals C1 and C2, is stored in the address 2 of the storage unit 504. Through this, the signal C1+C2 is ultimately stored in the address 2. Note that while the designation information indicates the focus control area, the same address is output twice.

A storage unit control signal (readout) expresses, in a simplified manner, an address in the storage unit 504 when reading out a signal written into the storage unit 504 as described above, and is output from the operation control unit 505. In accordance with this address, signals are read out from the storage unit 504 for each of the pixels 203 as display/recording image signals. By carrying out the same processing thereafter, it is possible to generate a display/recording image from the image signals output from the image sensor 103. The example shown in FIG. 6 illustrates a case in which image signals are output from all of the addresses, but it should be noted that in the case where it is necessary to reduce the resolution, such as a case in which the signals are output to a display device, the signals are thinned and read out from the storage unit 504, added and read out, or the like.

As described thus far, the number of signals read out from the line memory 306 for a single line of the image sensor 103 is twice the number of the photoelectric converters, or in other words, twice the number of pixels. However, with respect to the pixels that are outside of the focus control area, the signals are added together in twos by the timing control circuit 307 and output, and thus it is possible to reduce the readout time to half, as compared to a case in which the pixels are read out individually without adding.

Returning to FIG. 4, in step S102, when the display/recording image is generated and displayed in, for example, an input device (not shown) that also functions as a display device, such as a touch panel or the like, the designation of the focus control area is received as described with reference to FIGS. 3A through 3C. Then, in step S103, the focus control area determination unit 107 determines the focus control area in accordance with the external input information sent from the external input unit 110. Then, in step S104, the designation information generation unit 106 generates, based on the focus control area information, the designation information for the image sensor 103 and the signal operation unit 104.

Next, in step S105, it is determined whether or not the image capturing has ended. The present flow ends in the case where the image capturing has ended, but in the case where the image capturing has not ended, the flow returns to step S101, and the aforementioned processing is repeated based on the designation information generated in step S104. The serial flow is then repeated until the image capturing ends (that is, until YES in step S105).

Figure 7:
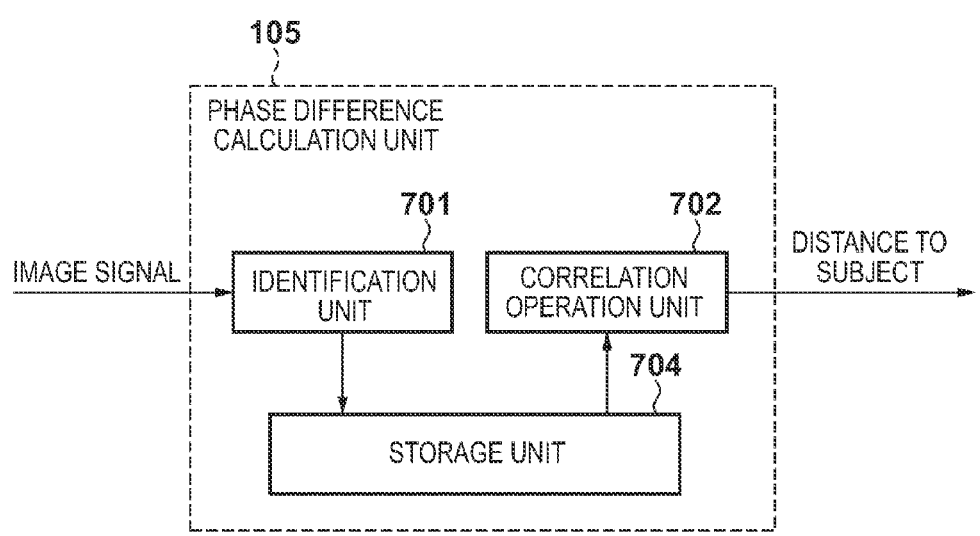
FIG. 7 is a block diagram illustrating a configuration of a phase difference calculation unit according to the first embodiment.

The image signals output from the image sensor 103 are also input into the phase difference calculation unit 105, where a phase difference to be used in focus control AF according to the phase difference detection method is calculated based on the input image signals. FIG. 7 is a block diagram illustrating the internal configuration of the phase difference calculation unit 105. In FIG. 7, an identification unit 701 identifies, from the image signals read out from the image sensor 103, the image signals of the photoelectric converters PD1 and PD2 of the pixels within the focus control area. The identification unit 701 can be configured so as to make selections based on the designation information that is generated by the designation information generation unit 106 and that indicates the focus control area, but can also be configured so as to make an identification without using the designation information, in the following manner. That is, 1-bit information is added to the digitized image signals output from the image sensor 103, so that it can be identified whether or not the output signals of the two adjacent photoelectric converters PD1 and PD2 have been added by the timing control circuit 307. Then, the identification unit 701 is configured so that the identification is carried out by analyzing this 1-bit information.

Reference numeral 704 denotes a storage unit that stores the identified pixel signals, and reference numeral 702 denotes a correlation operation unit. Of the pixel signals stored in the storage unit 704, a correlation operation is carried out between an image based on the image signal of the photoelectric converter PD1 and an image based on the image signal of the photoelectric converter PD2, and the phase difference evaluation value is calculated. The obtained phase difference evaluation value is then output to the AF control unit 109 as information of the distance to the subject.

Based on the phase difference evaluation value from the phase difference calculation unit 105, the AF control unit 109 determines a target focus position, and passes a movement direction and a movement amount from the current focus position to the optical system driving unit 102 as focus information.

Note that the AF control based on the phase difference evaluation value between the image based on the image signal from the photoelectric converter PD1 and the image based on the image signal from the photoelectric converter PD2 within the focus control area is the same as the AF control according to the known phase difference detection method, and thus detailed descriptions thereof will be omitted.

As described thus far, according to the present first embodiment, for pixels within the focus control area, the image signals of the photoelectric converters PD1 and PD2 are read out individually, whereas for pixels outside of the focus control area, the image signals of the photoelectric converters PD1 and PD2 are added on a pixel-by-pixel basis and read out. Through this, it is possible to set the focus control area at a desired area within the image sensor, and possible to reduce the readout time, as compared to the case where the image signals of the photoelectric converters PD1 and PD2 are always read out individually, while obtaining the signals necessary for the phase difference calculation used in the focus control. It is thus possible to increase the output rate of the image signals output from the image sensor.

Second Embodiment

Figure 8:
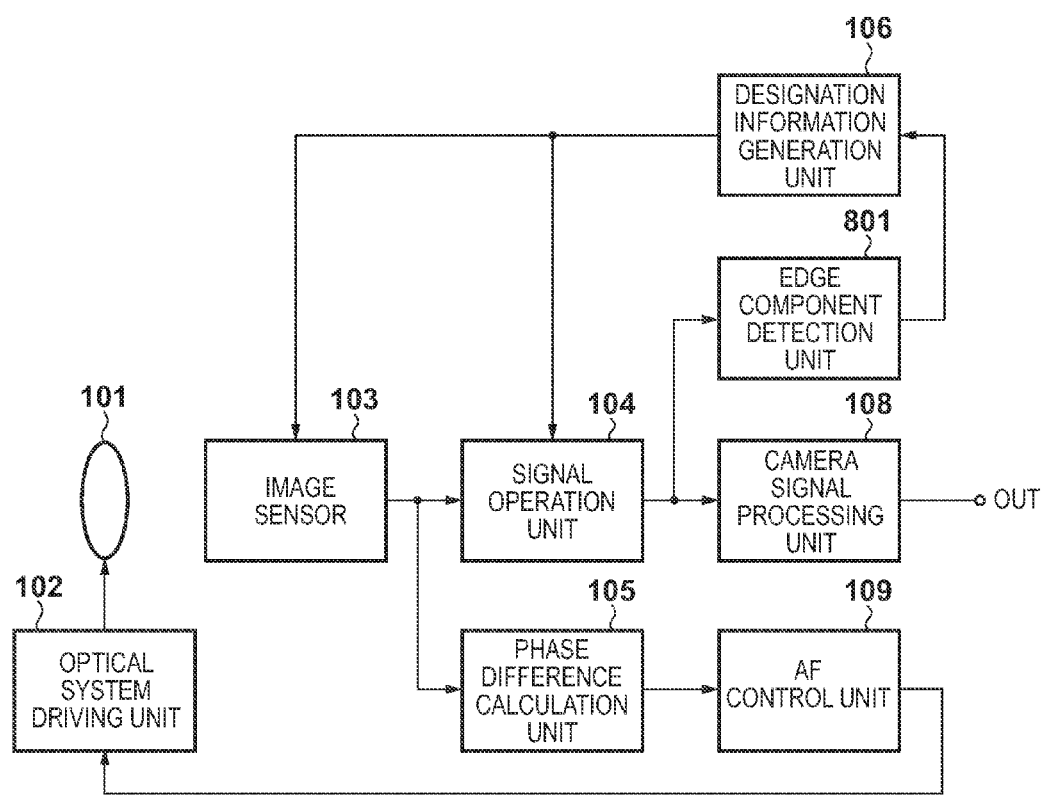
FIG. 8 is a block diagram illustrating a brief configuration of an image capturing apparatus according to a second embodiment.

Next, a second embodiment of the present invention will be described. FIG. 8 is a block diagram illustrating a brief configuration of an image capturing apparatus according to the second embodiment. In the aforementioned first embodiment, the focus control area designated by the user is input through the external input unit 110; the second embodiment differs from the first embodiment in that the image capturing apparatus automatically determines the focus control area. Accordingly, the configuration differs in that instead of the external input unit 110 and the focus control area determination unit 107 illustrated in FIG. 1, an edge component detection unit 801 has been added, as shown in FIG. 8. Other constituent elements that are the same as those illustrated in FIG. 1 are given the same reference numerals, and descriptions thereof are omitted.

In the second embodiment, the edge component detection unit 801 detects edge components contained in the image signals based on the display/recording image output from the signal operation unit 104, determines the focus control area based on the detected edge components, and outputs the focus control area information.

Figure 9:
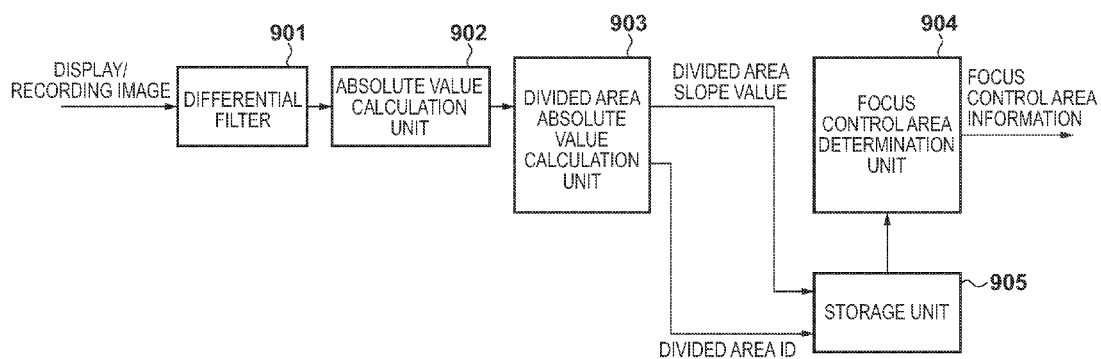
FIG. 9 is a block diagram illustrating a configuration of an edge component detection unit according to the second embodiment.

FIG. 9 is a block diagram illustrating the configuration of the edge component detection unit 801, configured from blocks that carry out edge detection and determine a focus control area based thereupon. A differential filter 901 calculates a signal level slope value from the display/recording image, and can be configured of, for example, a known Sobel filter. An absolute value calculation unit 902 obtains an absolute value of the calculated slope value. A divided area absolute value calculation unit 903 integrates the absolute values of the slope values of respective pixels in each of areas obtained through division, and finds a divided area slope value. Note that the "divided area" mentioned here refers to a section determined by, for example, dividing the display/recording image into N×M equal sections in the vertical and the horizontal directions. A storage unit 905 that stores the absolute values of the slope values for each of the divided areas, and a focus control area determination unit 904 determines a focus control area based on the divided area slope value and a predetermined benchmark and sends the result to the designation information generation unit 106 as the focus control area information.

Figure 10:
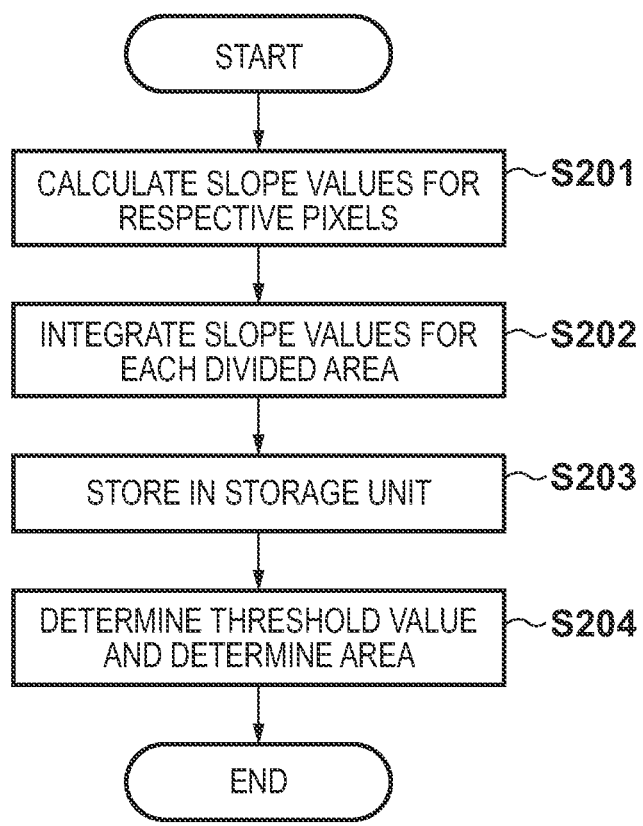
FIG. 10 is a flowchart illustrating a process for detecting an edge component and determining a focus control area according to the second embodiment.

In the second embodiment, where the edge component detection unit 801 configured as described above is used, a focus control area determination process that is based on an edge detection result and is illustrated in FIG. 10 is carried out instead of the process for determining the focus control area carried out in step S103 in FIG. 4 as described in the first embodiment. The other processes are the same as the processes described with reference to FIG. 4, and therefore descriptions thereof will be omitted.

FIG. 10 is a flowchart illustrating a process for detecting an edge component and determining a focus control area. When the edge component detection process is started, in step S201, a slope value is calculated for each pixel by the differential filter 901, after which the absolute value calculation unit 902 calculates, on a pixel-by-pixel basis, absolute values for the calculated slope values. In step S202, the divided area absolute value calculation unit 903 integrates the slope values that have been converted into absolute values on a pixel-by-pixel basis for each of the divided areas, thus calculating the divided area slope values. In step S203, the divided area slope values are stored in the storage unit 905, and in step S204, the focus control area is determined based on the divided area slope values stored in the storage unit 905. Here, the average of the calculated divided area absolute values is taken as a threshold value; the slope values of the respective divided areas are compared to the threshold value, and divided areas that are greater than the threshold value are taken as focus control area candidates. Alternatively, instead of the average of the divided area slope values, the focus control area candidates may be determined using a predetermined threshold.

Figure 11:
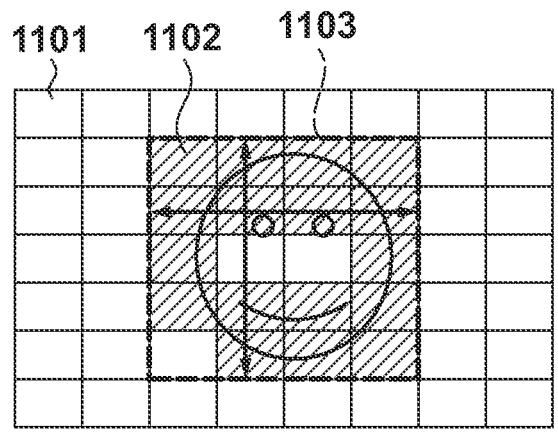
FIG. 11 is a schematic diagram illustrating determination of a focus control area according to the second embodiment.

FIG. 11 illustrates a display/recording image after the focus control area has been determined. Reference numeral 1101 denotes the aforementioned divided areas; the image has been divided into a total of 56 divided areas, with eight in the horizontal direction and seven in the vertical direction, and the display/recording image is roughly divided into sections as illustrated in FIG. 11. Divided areas 1102 are areas in which slope values are greater than the threshold value; that is, focus control area candidates, and indicated by the gray color. The area indicated by the rectangle 1103 that includes the focus control area candidates determined in this manner is determined to be the focus control area, and is sent to the designation information generation unit 106 as focus control area information.

As described thus far, according to the second embodiment, the focus control area is determined automatically by detecting edge components from an image obtained through image capturing, and thus the same effects as those described in the first embodiment can be achieved without requiring input from a user.

Third Embodiment

Figure 12:
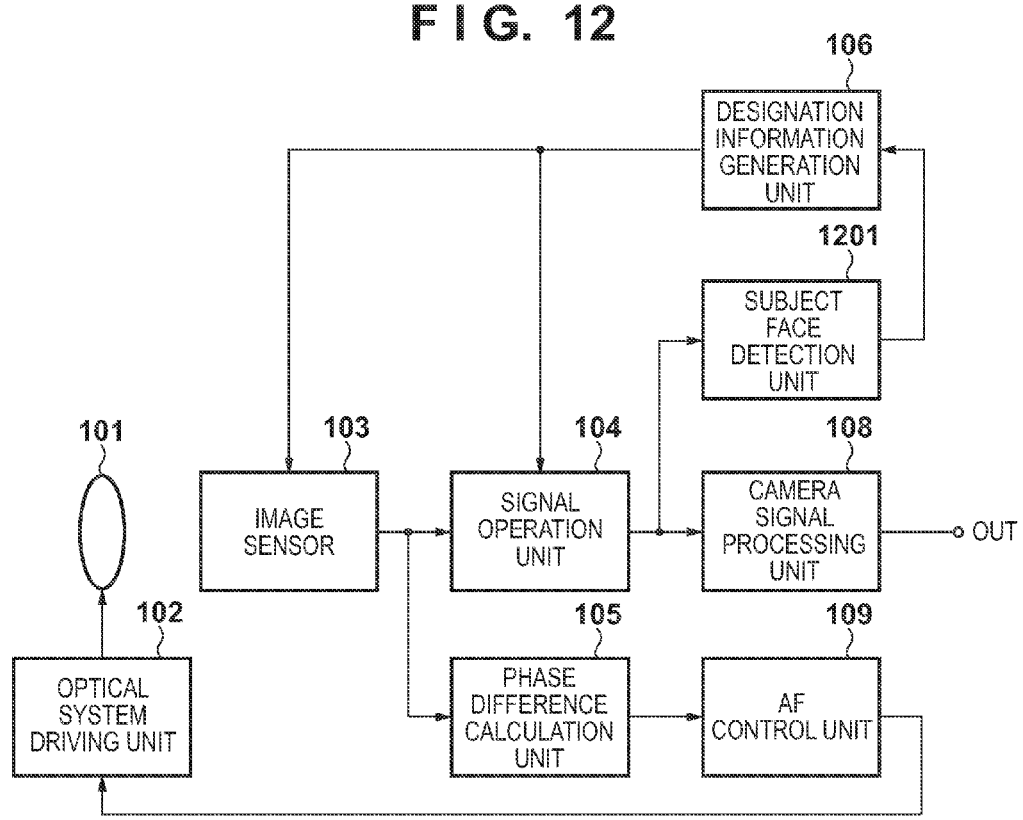
FIG. 12 is a block diagram illustrating a brief configuration of an image capturing apparatus according to a third embodiment.

Next, a third embodiment of the present invention will be described. FIG. 12 is a block diagram illustrating a brief configuration of an image capturing apparatus according to the third embodiment. In the aforementioned second embodiment, the focus control area is determined based on edge components detected from the display/recording image; the present third embodiment differs in that the face of a main subject contained in a display/recording image is detected, and the focus control area is determined based on the detected face. Accordingly, in FIG. 12, a subject face detection unit 1201 has been added in place of the edge component detection unit 801 indicated in FIG. 8. Other constituent elements that are the same as those illustrated in FIG. 8 are given the same reference numerals, and descriptions thereof are omitted.

In the third embodiment, the subject face detection unit 1201 detects the face of a subject from the display/recording image, determines an area that includes the detected face to be the focus control area, and outputs the focus control area information.

Figure 13:
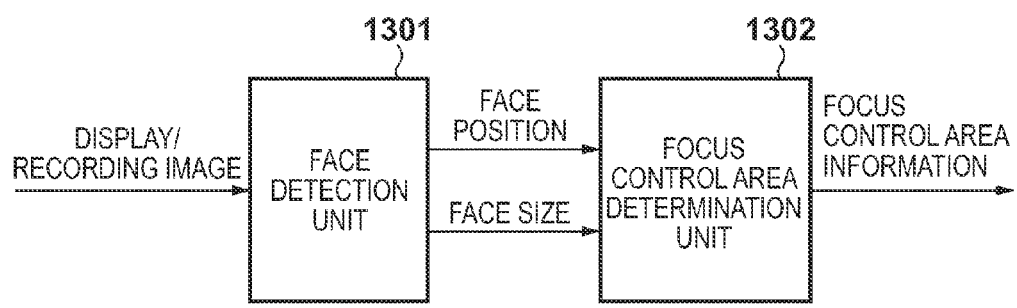
FIG. 13 is a block diagram illustrating a configuration of a subject face detection unit according to the third embodiment.

FIG. 13 is a block diagram illustrating the configuration of the subject face detection unit 1201. A face detection unit 1301 detects the face of a subject, and outputs at least the size of the detected subject face and the position information of the detected subject face. Note that various methods are known as face detection methods, and any such method may be used here. A focus control area determination unit 1302 determines the focus control area based on the size of the face and the position information of the face output from the face detection unit 1301.

Figure 14:
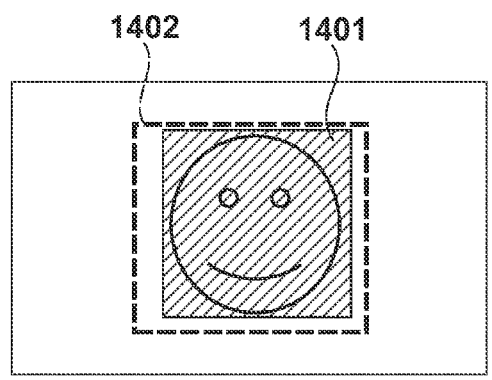
FIG. 14 is a schematic diagram illustrating determination of a focus control area according to the third embodiment.

FIG. 14 illustrates a face detected by the subject face detection unit 1201 and a focus control area that has been determined. Reference numeral 1401 denotes the position of the face and the size of the face detected by the face detection unit 1301, and reference numeral 1402 denotes the focus control area determined based upon the position of the face and the size of the face. As a method for determining the focus control area, for example, a divided area that has been determined by dividing the display/recording image into N×M equal divisions in the vertical and the horizontal directions and that includes the detected face may be determined as the focus control area. Alternatively, the focus control area may be determined using a different method, such as setting the area of the face itself as the focus control area, determining a focus control area having a predetermined size whose center coincides with the center of the detected face, and so on. The subject face detection unit 1201 passes the focus control area information of the focus control area determined in this manner to the designation information generation unit 106.

The process for determining the focus control area based on the detected face described above is carried out instead of the process for determining the focus control area carried out in step S103 of FIG. 4 as described in the first embodiment. The other processes are the same as the processes described with reference to FIG. 4, and therefore descriptions thereof will be omitted.

As described thus far, according to the third embodiment, in addition to the same effects as those described in the first embodiment, accurate focus control can be carried out automatically using the face of a main subject.

Although the third embodiment has described a case in which the face of a main subject (that is, the face of a person) is detected, it should be noted that the present third embodiment is not limited thereto; a predetermined subject such as a pet, a car, or the like may be detected as well.

Fourth Embodiment

Figure 15:
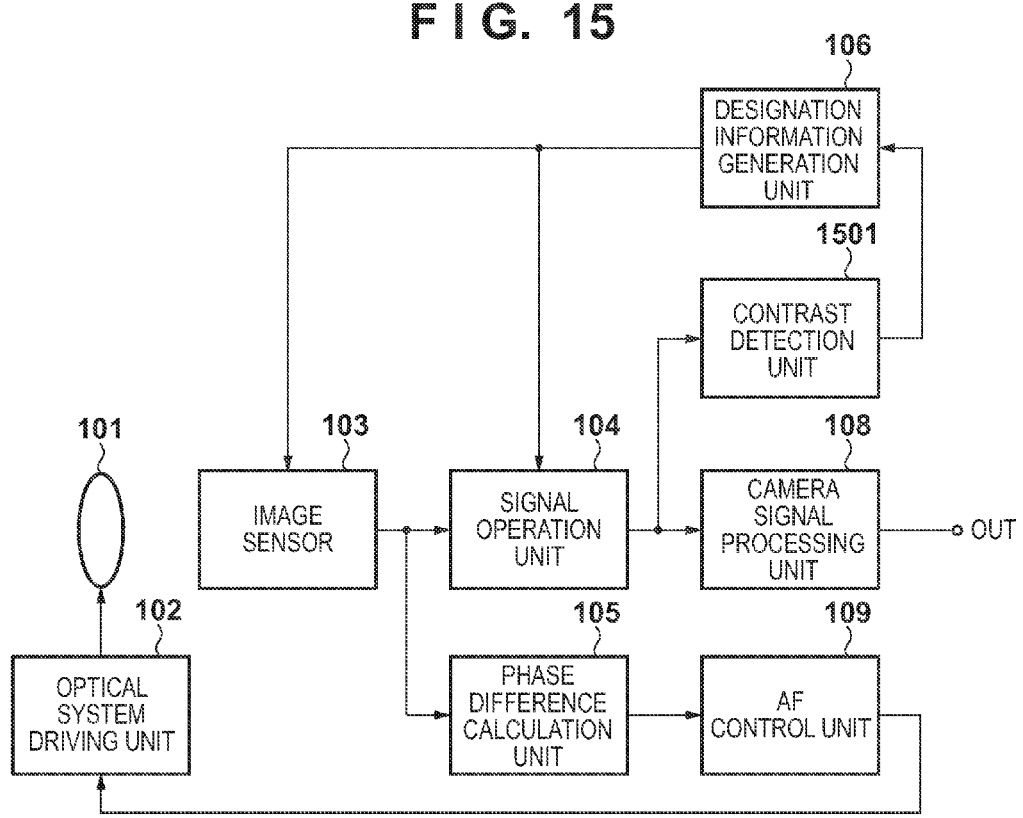
FIG. 15 is a block diagram illustrating a brief configuration of an image capturing apparatus according to a fourth embodiment.

Next, a fourth embodiment of the present invention will be described. FIG. 15 is a block diagram illustrating a brief configuration of an image capturing apparatus according to the fourth embodiment. In the aforementioned second embodiment, the focus control area is determined based on edge components detected from the display/recording image, and in the aforementioned third embodiment, the focus control area is determined based on the face of a main subject detected from the display/recording image. The present fourth embodiment differs in that an area having a high contrast value is detected from the display/recording image, and the detected area is taken as the focus control area. Accordingly, FIG. 15 differs from FIGS. 1, 8, and 12 in that a contrast detection unit 1501 is provided, but because the other constituent elements are the same, the same reference numerals are given thereto and descriptions thereof are omitted.

Figure 16:
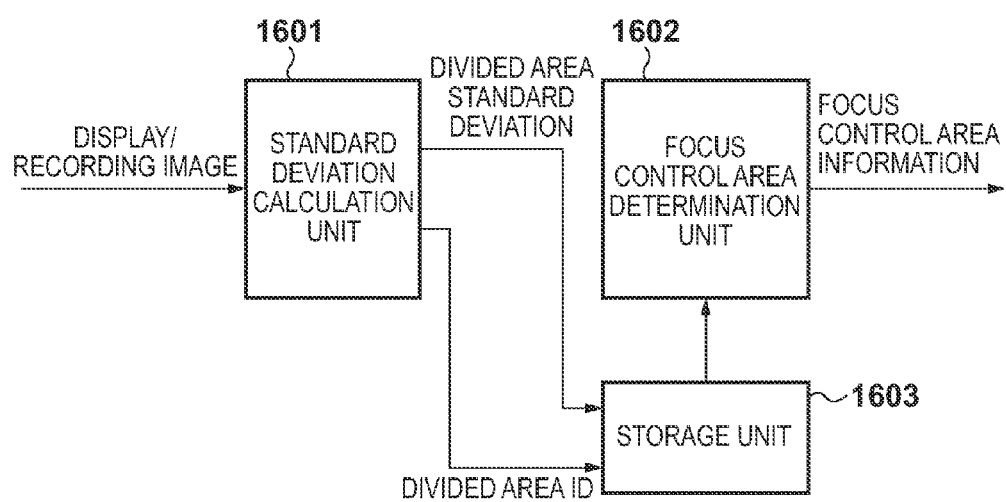
FIG. 16 is a block diagram illustrating a configuration of a contrast detection unit according to the fourth embodiment.

FIG. 16 is a block diagram illustrating the configuration of the contrast detection unit 1501. A standard deviation calculation unit 1601 calculates a standard deviation for each of divided areas. Note that the "divided area" mentioned here refers to a section determined by, for example, dividing the display/recording image into N×M equal sections in the vertical and the horizontal directions. The standard deviation calculation unit 1601 calculates a standard deviation for the pixel levels in each section, or in other words, calculates differences between the brightnesses of the pixel levels. A storage unit 1603 stores the calculated standard deviations for the respective divided areas; a focus control area determination unit 1602 determines a focus control area based on the standard deviations in the respective divided areas and a predetermined benchmark value, and sends focus control area information to the designation information generation unit 106.

Figure 17:
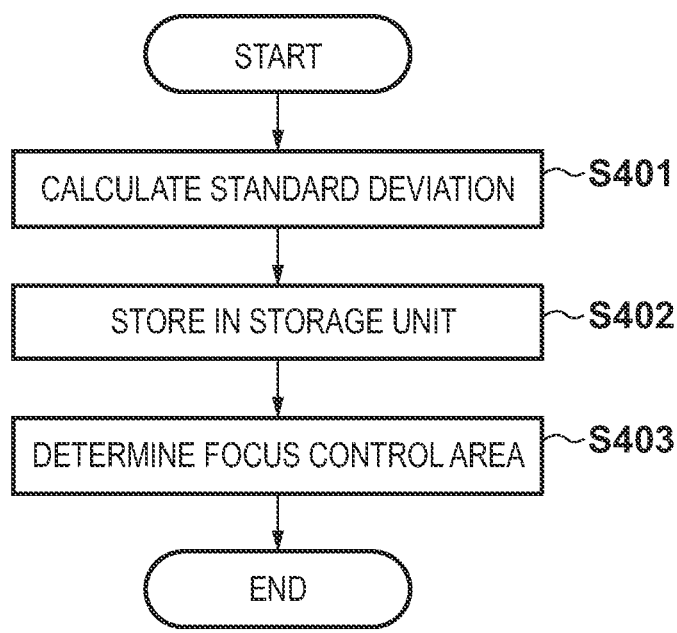
FIG. 17 is a flowchart illustrating a contrast detection process according to the fourth embodiment.

In the present fourth embodiment, where the contrast detection unit 1501 configured as described above is used, a focus control area determination process that is based on a contrast value and is illustrated in FIG. 17 is carried out instead of the process for determining the focus control area carried out in step S103 in FIG. 4 as described in the first embodiment. The other processes are the same as the processes described with reference to FIG. 4, and therefore descriptions thereof will be omitted.

When the contrast detection is started, in step S401, the standard deviation calculation unit 1601 calculates the standard deviations for each of the divided areas. Then, in step S402, the calculated standard deviations for the respective divided areas are stored in the storage unit 1603, and in step S403, the focus control area is determined based on the standard deviations for the respective divided areas stored in the storage unit 1603. Here, the average of the calculated standard deviations of the divided areas is taken as a threshold value; the standard deviations of the respective divided areas are compared to the threshold value, and divided areas that are greater than the threshold value are taken as focus control area candidates. Alternatively, instead of the average of the standard deviations for the respective divided areas, the focus control area candidates may be determined using a predetermined threshold.

Figure 18:
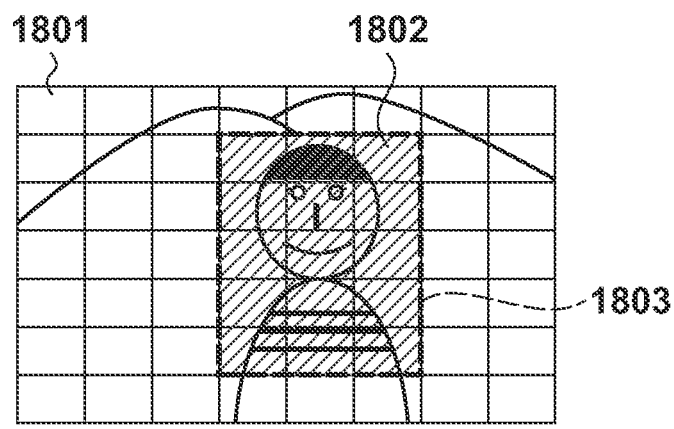
FIG. 18 is a schematic diagram illustrating determination of a focus control area according to the fourth embodiment.

FIG. 18 illustrates a display/recording image after the focus control area has been determined. Reference numeral 1801 denotes the aforementioned divided areas; the image has been divided into a total of 56 divided areas, with eight in the horizontal direction and seven in the vertical direction, and as illustrated in FIG. 18, the display/recording image is divided into general sections. Reference numeral 1802 denotes divided areas in which the standard deviation is greater than the threshold value, namely, focus control area candidates, by the gray color. The area indicated by the rectangle 1803 that includes the focus control area candidates determined in this manner is determined to be the focus control area, and is sent to the designation information generation unit 106 as focus control area information.

As described thus far, according to the fourth embodiment, an area that includes a high-contrast portion suited to focus detection is automatically determined as the focus control area based on the image obtained from the image capturing, and thus in addition to the same effects as those described in the first embodiment, it is possible to carry out highly-accurate focus control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-013370, filed Jan. 25, 2011 which is hereby incorporated by reference herein in its entirety.

What is claimed is:

1. An image capturing apparatus comprising:
an image sensor including multiple pixels, each pixel having multiple photoelectric converters that receive light beams that have passed through different areas of an exit pupil of an optical system and that output pupil-divided image signals, a storage unit that stores the respective pupil-divided image signals output from the respective photoelectric converters, and a control unit that switches between an operation of outputting the individual pupil-divided image signals stored in the storage unit, and an operation of adding the image signals on a pixel-by-pixel basis and outputting the resulting signal;
a determination unit configured to determine a focus control area that is an area of the image sensor where is to be focused, using an image expressed by the image signal output from the image sensor; and
a focus control unit configured to carry out focus control according to the phase difference detection method based on the pupil-divided image signals output from the pixels within the focus control area,
wherein the control unit switches between an operation that the pupil-divided image signals output from pixels within the focus control area are output individually, and an operation that the pupil-divided image signals output from pixels outside of the focus control area are added on a pixel-by-pixel basis and output.

2. The image capturing apparatus according to claim 1, further comprising:
a signal operation unit configured to, of the image signals output from the image sensor, add the pupil-divided image signals in the focus control area on a pixel-by-pixel basis, and output the image signals outside of the focus control area as-is,
wherein the determination unit uses an image of the image signals output from the signal operation unit.

3. The image capturing apparatus according to claim 1, further comprising:
an input unit for a user to designate the focus control area, wherein the determination unit determines the focus control area based on an input from the input unit.

4. The image capturing apparatus according to claim 2, further comprising:
an edge detection unit configured to detect an edge component of an image based on the image signals output from the signal operation unit,
wherein the determination unit determines an area that includes an area in which the edge component has been detected as the focus control area.

5. The image capturing apparatus according to claim 2, further comprising:
a detection unit configured to detect a predetermined subject based on the image signals output from the signal operation unit,
wherein the determination unit determines an area that includes an area in which the subject has been detected as the focus control area.

6. The image capturing apparatus according to claim 5, wherein the predetermined subject is the face of a person.

7. The image capturing apparatus according to claim 2, further comprising:
a contrast detection unit configured to detect an area in which the contrast is higher than a predetermined threshold value, based on the image signals output from the signal operation unit,
wherein the determination unit determines an area that includes an area detected by the contrast detection unit as the focus control area.

8. A control method for an image capturing apparatus, the apparatus including an image sensor having multiple pixels, each pixel having multiple photoelectric converters that receive light beams that have passed through different areas of an exit pupil of an optical system and that output pupil-divided image signals, a storage unit that stores the respective pupil-divided image signals output from the respective photoelectric converters, and a control unit that switches between an operation of outputting the individual pupil-divided image signals stored in the storage unit, and an operation of adding the image signals on a pixel-by-pixel basis and outputting the resulting signal, and the method comprising:
determining a focus control area that is an area of the image sensor where is to be focused, using an image expressed by the image signal output from the image sensor;
switching between an operation that the pupil-divided image signals output from pixels within the focus control area are output individually, and an operation that the pupil-divided image signals output from pixels outside of the focus control area are added on a pixel-by-pixel basis and output; and
carrying out focus control according to the phase difference detection method based on the pupil-divided image signals output from the pixels within the focus control area.

9. An image capturing apparatus comprising:
an image sensor including multiple microlenses and photoelectric converters, wherein each of the microlenses corresponds to a plurality of photoelectric converters, and the image sensor is configured to output a first signal obtained by combining signals from the photoelectric converters corresponding to each microlens, and a second signal obtained without combining signals from the photoelectric converters;
a determination unit configured to determine a focus control area in the image sensor where is to be focused, using the first signal output from the image sensor; and
a control unit configured to control to output the second signal from the focus control area determined by the determination unit.

10. The image capturing apparatus according to claim 9, further comprising:
a signal operation unit configured to add the second signal output from the focus control area by unit of photoelectric converters corresponding to each microlens and output an added second signal in the focus control area, and output the first signal outside of the focus control area as-is,
wherein the determination unit further uses the added second signal to determine the focus control area.

11. The image capturing apparatus according to claim 9, further comprising:

an input unit for a user to designate the focus control area,
wherein the determination unit determines the focus control area by giving priority to an input from the input unit.

12. The image capturing apparatus according to claim 9, further comprising:

an edge detection unit configured to detect an edge component of an image based on the first signal,
wherein the determination unit determines an area that includes an area in which the edge component has been detected as the focus control area.

13. The image capturing apparatus according to claim 9, further comprising:

a detection unit configured to detect a predetermined subject based on the first signal,
wherein the determination unit determines an area that includes an area in which the subject has been detected as the focus control area.

14. The image capturing apparatus according to claim 13, wherein the predetermined subject is the face of a person.

15. The image capturing apparatus according to claim 9, further comprising:

a contrast detection unit configured to detect an area in which the contrast is higher than a predetermined threshold value, based on the first signal,
wherein the determination unit determines an area that includes an area detected by the contrast detection unit as the focus control area.

16. A control method for an image capturing apparatus, the apparatus including an image sensor having multiple microlenses and photoelectric converters, wherein each of the microlenses corresponds to a plurality of photoelectric converters, and the image sensor is configured to output a first signal obtained by combining signals from the photoelectric converters corresponding to each microlens, and a second signal output without combining signals from the photoelectric converters, the method comprising:

determining a focus control area in the image sensor where is to be focused, using the first signal output from the image sensor;
outputting the second signal from the determined focus control area.

* * * * *